(12) United States Patent
Kawabata

(10) Patent No.: US 6,370,262 B1
(45) Date of Patent: *Apr. 9, 2002

(54) INFORMATION PROCESSING APPARATUS AND REMOTE APPARATUS FOR OBJECT, USING DISTANCE MEASURING APPARATUS

(75) Inventor: Takashi Kawabata, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/551,988

(22) Filed: Nov. 2, 1995

(30) Foreign Application Priority Data

Nov. 8, 1994 (JP) .............................................. 6-298052

(51) Int. Cl.$^7$ ................................................. G06K 9/46
(52) U.S. Cl. ....................... 382/106; 382/154; 382/203; 396/121; 396/128
(58) Field of Search ................................ 382/218, 217, 382/106, 154, 209, 274, 190, 214, 199, 203; 396/121, 123, 122, 125, 128; 356/3, 3.13, 5.03, 5.04; 348/140, 149, 353, 346, 358

(56) References Cited

U.S. PATENT DOCUMENTS

| 4,408,288 A | * | 10/1983 | Kondo ........................ 382/106 |
| 4,637,705 A | * | 1/1987 | Kawabata .................... 396/121 |
| 4,816,861 A | * | 3/1989 | Taniguchi et al. ........... 396/123 |
| 4,943,824 A | * | 7/1990 | Nabeshima et al. ......... 396/122 |
| 5,031,228 A | * | 7/1991 | Lu .............................. 382/227 |
| 5,134,661 A | * | 7/1992 | Reinsch ...................... 382/100 |
| 5,221,955 A | * | 6/1993 | Inoue ......................... 356/3.01 |
| 5,289,227 A | * | 2/1994 | Kinjo ........................... 396/78 |
| 5,291,563 A | * | 3/1994 | Maeda ........................ 382/282 |
| 5,296,888 A | * | 3/1994 | Yamada ........................ 396/51 |
| 5,307,136 A | * | 4/1994 | Saneyoshi ..................... 356/1 |
| 5,331,419 A | * | 7/1994 | Yamada et al. ............... 348/64 |
| 5,392,091 A | * | 2/1995 | Iwasaki ...................... 396/234 |
| 5,546,538 A | * | 8/1996 | Cobbley et al. ......... 395/200.01 |
| 5,615,398 A | * | 3/1997 | Matsuyama ................. 396/128 |
| 5,731,864 A | * | 3/1998 | Hamada et al. ............. 396/121 |
| 5,815,203 A | * | 9/1998 | Lee et al. .................... 348/358 |
| 5,900,927 A | * | 5/1999 | Hasegawa .................. 356/3.13 |

OTHER PUBLICATIONS

Levine. Vision in Man and Machine. McGraw Hill, 1985, pp. 176–180.*

* cited by examiner

Primary Examiner—Jon Chang
(74) Attorney, Agent, or Firm—Fitzpatrick, Cella, Harper & Scinto

(57) ABSTRACT

An information processing apparatus using a distance measuring apparatus includes a distance measuring device for producing distance information related to a distance for each of different areas in a scene, a photometry device for measuring brightness information of the scene, the photometry device dividing each of the areas measured by the distance measuring device into a plurality of divided areas and outputting the brightness information for each of the divided areas, and a signal processor. The signal processor detects a characteristic portion on the scene from the distance information for each of the areas and the brightness information from each of the divided areas, detects the characteristic portion in units for each of the divided areas, compares the characteristic portion with standard information on the scene and extracts scene information.

4 Claims, 9 Drawing Sheets

(REMOTE DISPLAY)      (DISPLAY AT PHOTOGRAPHING DISPLAY SIDE)
FIG. 6A1 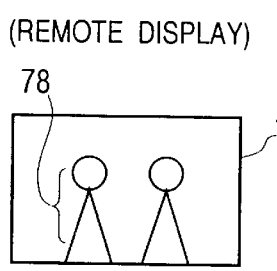    FIG. 6A2 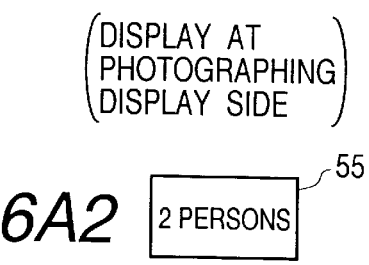
FIG. 6B1 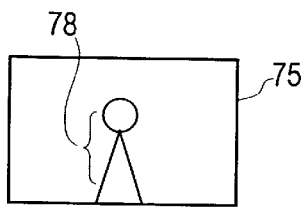    FIG. 6B2 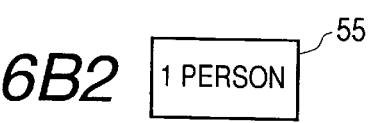
FIG. 6C1 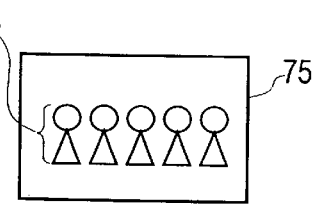    FIG. 6C2 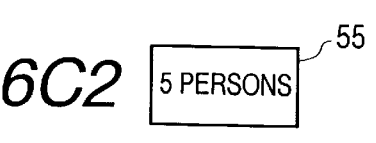
FIG. 7
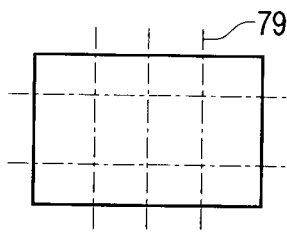

US 6,370,262 B1

INFORMATION PROCESSING APPARATUS AND REMOTE APPARATUS FOR OBJECT, USING DISTANCE MEASURING APPARATUS

BACKGROUND OF THE INVENTION

1. Field of the Invention

The present invention relates to an object information processing apparatus having a function to divide an object depending upon brightness information and/or a function to divide an object depending upon distance information, in extraction of object information, and also to a remote apparatus arranged to transmit signals through wire or radio to or from the information processing apparatus.

2. Related Background Art

FIG. 9 is a block diagram to show the schematic construction of a conventional example in the field of industrial instrumentation etc., and the prior art is explained referring to FIG. 9.

An imaging device 102 picks up an image of a region represented by 101 in a process or operation, and a signal of the image thus picked up is subjected to A/D conversion in an A/D circuit 103 and the signal after the A/D conversion is further subjected to any one of some processes as matters now stand.

For example, a lightness distribution processing circuit 104 first produces the equivalent of the histogram indicated by numeral 105. This distribution table shows a brightness distribution of the image, which is a distribution (of numbers) of pixels against brightness on the vertical axis. Here, numeral 107 represents an area of a portion brighter than a determination level 106 automatically or preliminarily determined. The area of the portion 107 is then output to a content measuring circuit 108, which performs automatic instrumentation of the area (=content) of a white portion in the field. Further, based on the automatic instrumentation, automatic adjustment is carried out for an element of the process, such as adjustment of mixture ratio, for example.

Further, a lightness group processor denoted by numeral 109 groups adjacent pixels, as taking pixels with similar lightnesses as a group, and obtains a distribution of areas of the groups as a result of grouping, thereby obtaining a distribution of areas as indicated by numeral 110 with the scale for area on the vertical axis in the drawing. A measuring circuit 111 then obtains an area of numbers of similar lightness groups from this table to perform automatic instrumentation of not only a content of different lightnesses, but also a distribution of sizes, that is, grain sizes, thereby carrying out adjustment of the process, such as adjustment of agitation time.

If samples have a fixed shape, a reference pattern circuit 112 supplies a pattern of the shape, a coincidence discriminator 113 performs a coincidence check with the pattern, and a counting circuit 114 obtains a number of coincidences so as to count a number of samples coincident with the pattern, thereby counting a number of bolts, nuts, etc., or a number of red blood cells in the blood.

FIG. 10 is a block diagram to show the schematic construction of another conventional example, which was reported in a research report as to automated traveling or the like of a car or robot. It is explained below referring to FIG. 10.

An imaging device 122 is set on a traveling object 121 such as a vehicle, and a next-stage distance detector 123 obtains data of a measured distance. With this data of a measured distance, a selective calculator 124 takes steering information from a steering state output circuit 125 into consideration to obtain a traveling forward distance and a traveling side distance in a forward distance calculation circuit 126 and a side distance calculation circuit 127, thereby performing an automatic determination of a path from a correction of steering or adjustment of velocity.

Further, the report describes the following. The image information from the A/D converter 128 and the data of a measured distance from the distance detector 123 is supplied to an analyzer 129, which extracts a white line on a road (including extrapolation or interpolation thereof) as "one white and long in the forward direction". A steering control circuit 130 performs automatic steering from curvature of the white line in the forward direction to keep a distance thereto. A steering control circuit 132 performs steering or adjustment of velocity while similarly supplying the data to an analyzer 131 and extracting a "rail or guardrail" thereby.

The conventional examples, however, were unable to handle complicated patterns existing in the external field in a wide range, because they detected the luminance using A/D values of small dynamic ranges for simplification.

Because of this, calculation of area was likely to be affected by a fine density difference, for example. Further, since recognition was based only on limited patterns, they had a drawback that they were unable to handle a variety of patterns, though processing was simple.

SUMMARY OF THE INVENTION

One aspect of the application is to provide an object information processing apparatus which can extract only necessary object information from the field by a simple distance calculation and which can display the object information in a form useful to framing by a photographer.

One aspect of the application is a remote apparatus which can display object information in a form useful to framing by a photographer performing remote control.

One aspect of the application is to provide an apparatus which comprises distance measuring means for measuring distance information of each of areas preliminarily set in a field, photometry means for measuring brightness information of the field, and signal processing means for detecting a characteristic part on the field from the respective distance information and the brightness information and extracting object information by comparing the characteristic part with standard object information on the field on this occasion, wherein the distance information is obtained for each of area units obtained by roughly dividing the field, the characteristic part occupying inside the field is detected from the distance information and brightness information of the field, and the object information (e.g., the size of the object, a number of persons, etc.) is extracted based on coincidence between the characteristic part and the standard object information.

One aspect of the application is to provide an apparatus which comprises distance measuring means for measuring distance information of each of areas in a field set, photometry means for measuring brightness information of the field, and signal processing means for dividing the field into a plurality of areas, based on the brightness information from the photometry means, obtaining a plurality of distance information by the distance measuring means in accordance with the areas thus divided into, extracting a characteristic part on the field from the distance information and the brightness information, and comparing the characteristic part with standard object information on the field on this occasion to extract the object information, wherein the field is roughly divided into areas, based on the brightness information from the photometry means, the distance measuring means obtains distance information in these areas, the characteristic part occupying inside the field is detected based on the distance information and the brightness information of the field, and the object information (e.g., the size of the object, a number of persons, etc.) is extracted based on coincidence between the characteristic part and the standard object information.

One aspect of the application is to provide an apparatus which comprises display means to which the object information is transferred from the object information processing apparatus, thereby displaying the information, wherein the object information (e.g., the size of the object, a number of persons, etc.) is displayed on display means on the side of a remote apparatus used in remotely controlling the object information processing apparatus.

One aspect of the application is to provide an information processing apparatus using a distance measuring apparatus for dividing a scene into different areas thereof and measuring distances of an object in the respective areas, wherein the apparatus is provided with a first processing circuit for obtaining characteristic data of the scene depending upon distance measurement results in the respective areas, a memory circuit for storing data of a reference, and a second processing circuit for specifying a state of the object or the object itself in the scene, based on the data from the first processing circuit and the data in the memory circuit, thereby determining a condition of the scene.

One aspect of the application is to provide an information processing apparatus using a distance measuring apparatus for dividing a scene into different areas thereof and measuring distances of an object in the respective areas, wherein the apparatus is provided with a first processing circuit for forming data indicating a distance map of the object in the scene in accordance with distance measurement results in the respective areas, and a second processing circuit for specifying a state of the object or the object itself in the scene, based on the data from the first processing circuit, thereby determining a condition of the scene.

One aspect of the application is to provide an information processing apparatus using a distance measuring apparatus for dividing a scene into different areas thereof and measuring distances of an object in the respective areas, wherein the apparatus is provided with a first processing circuit for obtaining a distribution of areas occupying far distances and areas occupying near distances in the scene with a border of a predetermined distance in accordance with distance measurement results in the respective areas, or an area ratio therebetween, thereby determining a condition of the scene.

One aspect of the application is to provide a processing system having a distance measuring apparatus for obtaining a distance of an object in a scene, wherein the system comprises a display device, provided separately from the distance measuring apparatus, wherein data obtained by the measuring apparatus is transmitted to the display device in non-contact with the measuring apparatus, and information processed is displayed in the remote display device.

These and other objects of the present invention will become apparent from embodiments thereof as explained referring to the drawings.

BRIEF DESCRIPTION OF THE DRAWINGS

FIGS. 6A1 to 6C2 are drawings to illustrate examples of a remote display with indications on a display 44 in FIG. 4;

FIG. 7 is a drawing similarly to illustrate another example of a remote display with an indication on the display 44 in FIG. 4;

DESCRIPTION OF THE PREFERRED EMBODIMENTS

The present invention will be explained in detail, based on the embodiments as illustrated.

Figure 1:
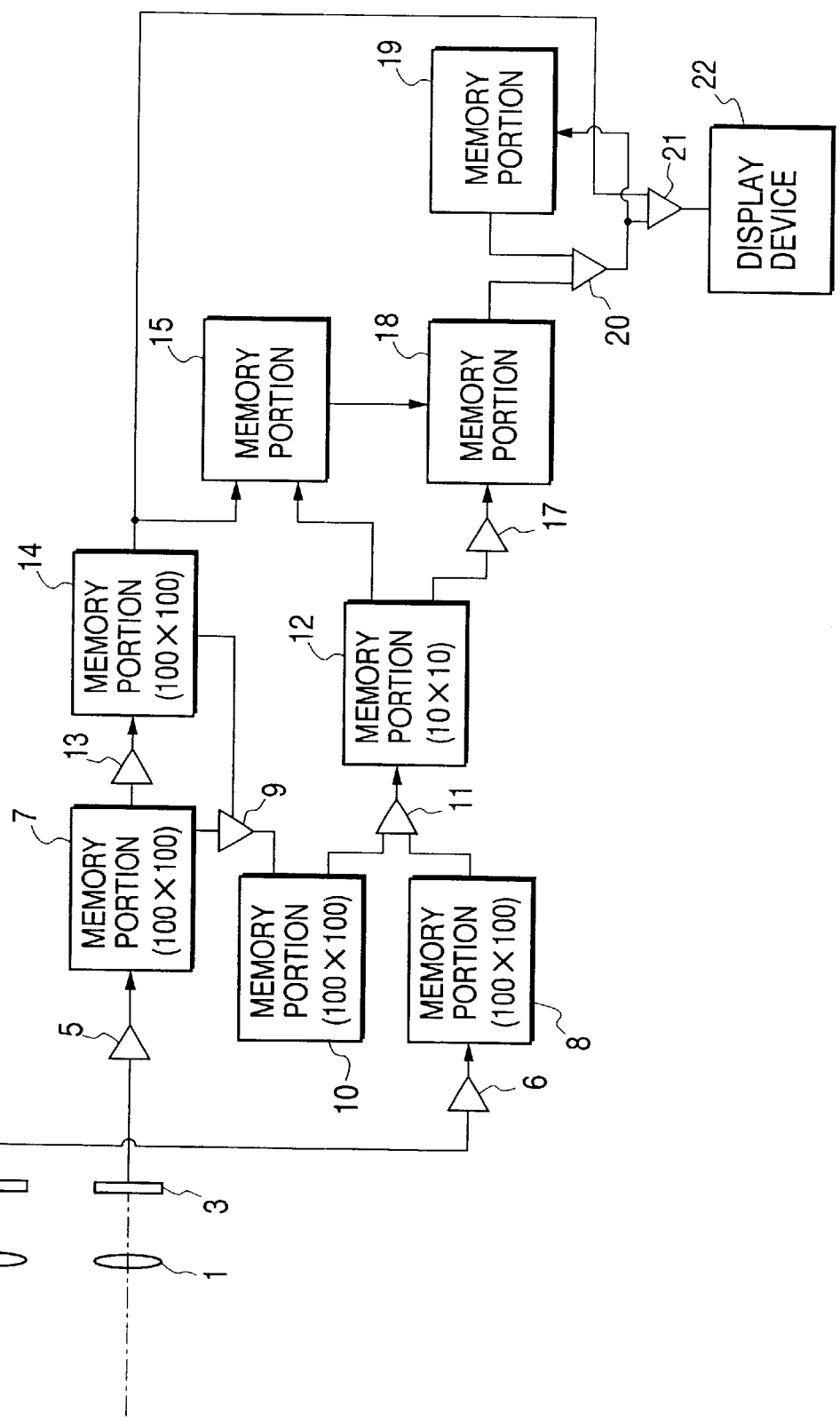
FIG. 1 is a block diagram to show the construction of an object information processing apparatus (of fixed length correlation) in the first embodiment of the present invention.

FIG. 1 is a block diagram to show the construction of the object information processing apparatus in the first embodiment of the present invention.

In FIG. 1, numerals 1, 2 denote lenses, which form respective images of the field on associated area sensors (two-dimensional photoelectric conversion elements) 3, 4 such as CCDs. The lenses 1, 2 have a predetermined baseline length and form the images with parallax on the area sensors 3, 4. Thus, the images on the sensors 3, 4 relatively change their positions depending upon a distance of an object. Numerals 5, 6 designate amplifiers, which perform amplification (including AGC processing such as storage time change with necessity) and A/D conversion of information from the area sensors 3, 4 and which output photoelectrically converted information of individual pixels to memory portions 7, 8 to store the information therein.

Luminance information of the field is effective to pattern extraction, but, in the cases of ordinary objects, an image includes a picture formed as a mixture of pattern information of various distances, and thus, it needs to be separated out before extraction.

However, since to obtain distances of respective pixels for this determination is reflected on relative positional deviation between two images depending upon the distance, the distances of the respective pixels cannot be calculated unless cross-correlation is taken between areas in the memory portions 7, 8 with groups of some pixels in distance measurement calculation, and calculation amounts therefor become extremely large.

Thus, the present embodiment is so arranged that, for example, an image of "100×100" is grouped into blocks of "10×10," a distance of each block is obtained as a distance of each group, and thereafter, it is determined which pixel portion has the distance in each block. This permits us to obtain distance data sufficient to extract a pattern in a plane resolution of "100×100" without performing distance calculations of "100×100" but by performing distance calculations of "10×10".

The reason is that the distance calculation is based on obtaining an amount of relative deviation between two images on the two eyes (i.e., the both sensors) for changing parts of image signals. In other words, a flat portion of an image signal does not (relatively) contribute to calculation for the same reason as deviation is not able to be descriminated in the flat portion of the image signal.

An image in the memory portion 7 is transferred through a corrector 9 to a memory portion 10. A correlater 11 performs a correlation operation for blocks of "10×10" in units of "10×10" pixels with signals of "100×100" in each of the two faces of the memory portion 8 and the memory portion 10.

Generally, with data of A (100, 100) and B (100, 100), x-directional deviation is obtained in the following manner. Namely, amounts of deviation are obtained from correlation by a product sum defined as follows:

for ($x=0$; $x<10$; $x=x+1$)

[for ($y=0$; $y<10$; $y=y+1$)

(with SIFT=0 to 9, results of x, y are given by SIFT to maximize the following $$\sum_{i=0}^{9} \sum_{j=1}^{9} [A(x*10+i; y*10+j)*B(x*10+i+SIFT; y*10+j)])].$$

The deviation amounts are stored in respective distance value storing areas of "10×10" in a memory portion 12.

Another method uses a SIFT value to minimize a sum of discrepancies (absolute values of differences) between A(x*10+i, y*10+j) and B(x*10+i+SIFT, y*10+j) as an equation for a correlation operation.

As described previously, the distances calculated herein are obtained mainly based on blocks with strong contrast (having large brightness differences) out of the blocks of "10×10".

Then, such preprocessing is carried out that an amplifier 13 (which may be composed of a differentiator) emphasizes portions with strong contrast in each block, the thus emphasized data is transferred to a memory portion 14, the correcting circuit 9 suppresses low-contrast portions or plural pieces of contrast information in each block at the same time, and the data is supplied to the correlater 11.

Namely, upon transferring data of respective pixels in the memory portion 7 to the memory portion 10, the data is transferred to the memory portion 10 after data with strong contrast out of the pixel data is emphasized while that with low contrast is suppressed. Similarly, as for the data transferred to the memory portion 8, the data is transferred also after being processed in an amplifier as described above and a correcting circuit (not shown). Then, the data in the memory portions 10 and 8 each is taken out in units of a block of 10×10, the correlation operation is carried out for each of the blocks, and the distance data is obtained block by block.

As described, calculation with blocks becomes a hundred times simpler using "10×10" than in the case of "100×100," but, because the distance values are given for the blocks, storage values in the memory portion 12 exist only one for each of the blocks of "10×10." Thus, the size of an image existing at a distance would have an error ten times that from one pixel to ten pixels in "100×100," and therefore, the data cannot be used for discrimination of a pattern.

When detailed positions in the blocks are obtained in combination with the strong-contrast information in the above memory portion 14, the same plane resolution can be achieved by the hundred times simpler calculation as in the case of the distance calculation of "100×100."

A memory portion 15 is a memory area in which the distance data is arranged and stored in the detailed resolution and in which distance values of surrounding blocks are used for distance-unknown points to assign the distance values to the "100×100" sections like a so-called "coloring of an outline drawing," that is, like a mosaic.

FIGS. 2A to 2E diagrammatically show this operation.

Figure 2A:
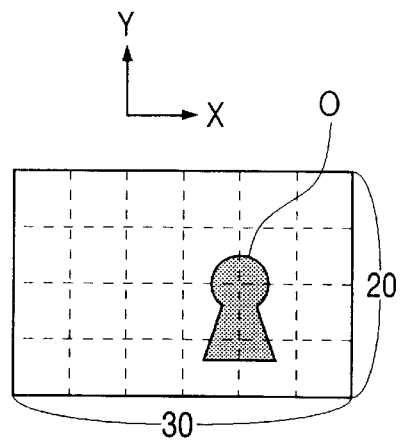
FIGS. 2A to 2E are drawings to diagrammatically show extraction of an object from distance measurement data and luminance information in the first embodiment of the present invention.

Let us suppose that an original picture is obtained as an image of "30×20" with an object on the right lower portion thereof, as shown in FIG. 2A. This information is grouped in the units of "5×5" to obtain distances for "6×4" blocks, which will result in obtaining 2 m only for right lower blocks and infinity for the other blocks, as shown in FIG. 2B.

Figure 2B:
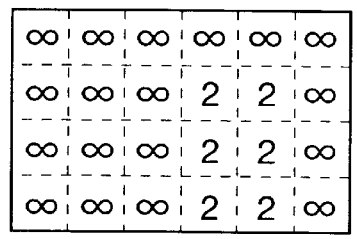
Figure 2C:
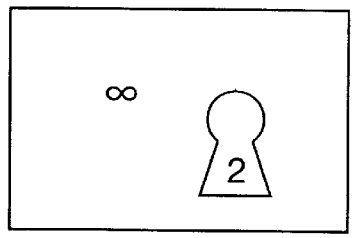

Here, employing correspondence with the contrast (density) information of the original picture of the FIG. 2A, a relation between the shape of object and the distance can be obtained by distance calculations of "6×4=24," as shown in FIG. 2C, without performing distance calculations of "30×20=600."

Namely, supposing each area sensor forms the above image, for example, of 30×20 as the aforementioned image instead of that of 100×100, distances are obtained for 6×4 blocks in total, as shown in FIG. 2B, each block consisting of 5×5 pixels in the above arrangement, and the data regarding the distances of the respective blocks are stored in the memory portion 12. On the other hand, the memory portion 14 stores image information with strong contrast in the above image of 30×20 in a positional relation with the pixels. Namely, in the case of the image of FIG. 2A, image portions with strong contrast are pixel portions in a contour part of an image O. Information regarding the pixel portions is stored as emphasized at positions corresponding to the pixel portions in the memory portion 14. Thus, for the blocks as determined as those of 2 m in FIG. 2B, it is determined from the data in the memory portion 14 which positions in the blocks correspond to the pixel portions in the above contour part. As a result, an image at the position in FIG. 2C is determined to be of 2 m, and the data, which is the distance of the object (2 m in the above case), and an address (a specific position of the object O on the X and Y axes) in the image (the image of 30×20) of the object, are input into a memory portion 15.

Figure 2D:
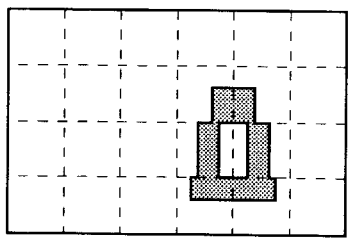
Figure 2E:
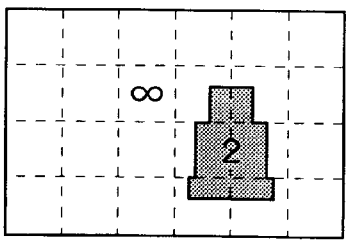

The relation of correspondence can be more simplified, for example, by using "detailed change place information for every block" as shown in FIG. 2D, in which information is extracted to pick up change points in each block from the original picture of FIG. 2A under such conditions that an x-directional change is between "0.4 and 1.0" and a y-directional change is between "0.0 and 0.6." Using such "detailed change place information for every block," a distance group image according to the change place information can be obtained as shown in FIG. 2E from the distance image of FIG. 2B.

As described above, it is possible to determine the "shape of an object cut out as to the distance," which permits the shape of an object to be discriminated as shown in FIG. 2E or FIG. 2C, from the distance image of rough blocks in FIG. 2B. This permits us to specify that the mid-range object in the six blocks in FIG. 2B has a downwardly spreading shape.

Of course, this example was explained with a simple pattern, but in the case of a complex pattern, that is, if a block has a plurality of contrasts (if there are two or more borders), it cannot be discriminated which contrast mainly contributes to a distance calculated for the block.

Thus, the present invention uses the correction function of the corrector 9 in FIG. 1 to eliminate erroneous distance measurements due to plural contrasts by limiting a number of contrast (border) portions in the blocks as to single-eye information (outputs from one sensor) to a small number. In more detail, places of maximum contrast in the blocks are stored in the memory portion 14, and the other lower-contrast portions are not transmitted to the memory portion 10 as corrected (suppressed) in the corrector 9, whereby only the high-contrast information is transmitted thereto and a distance corresponding to the information is obtained.

This realizes extraction of the field by distance.

Next, a magnification detector 17 in FIG. 1 calculates a magnification of the object which is determined by the distance obtained in the memory portion 12 and the focal length of the lenses 1, 2, the size on the field is calculated taking into account the magnification of the distance image from the memory portion 15, and the data including the real size of the above pattern is stored in a memory portion 18. A memory portion 19 stores data on a real size of a standard object, that is, in the case of a human, data regarding the width in the range of "10 cm to 1 m" and the height in the range of about "60 cm to 2 m", and a comparator 20 checks the size.

Namely, the real size (widths in the X- and Y-axis directions) of an object to become an object image is obtained from the distance obtained, the focal length, and the size and shape occupied by the image relative to the screen, determined in the memory portion 15. The real size is input into the memory portion 18. The comparator 20 compares this data with the data of the standard object to specify the image. The above data regarding the standard object includes not only the data for specifying a human, but also various standard data for specifying a variety of animals, cars, etc. The data is compared with these data to specify the image.

The above memory portion 18 also stores the data in the memory portion 15 in addition to that regarding the real size of the object as described above.

After that, a comparator 21 compares the data with the detailed image information, and a display 22 displays a type of the pattern, for example, "man," from resemblance, or displays a "number of persons" from a number of patterns, thus displaying extracted information for helping a photographer, by identifying an object to be photographed.

Such extracted information is particularly effective upon remote photography, in which far less information than that in the case of transmitting and recognizing the entire picture is transmitted through wire or radio to a distant photographer, which can be said to be very useful. In this case, a preferred arrangement is such that the display 22 is located near the photographer and receives signals from an object recognizing and determining means located in a camera or in the vicinity thereof to indicate them for the photographer's use. An acceptable arrangement may include the display 22 directly displaying the result specified by the comparison in the comparator 20.

The pattern coincidence will be explained in detail hereinafter.

Figure 3:
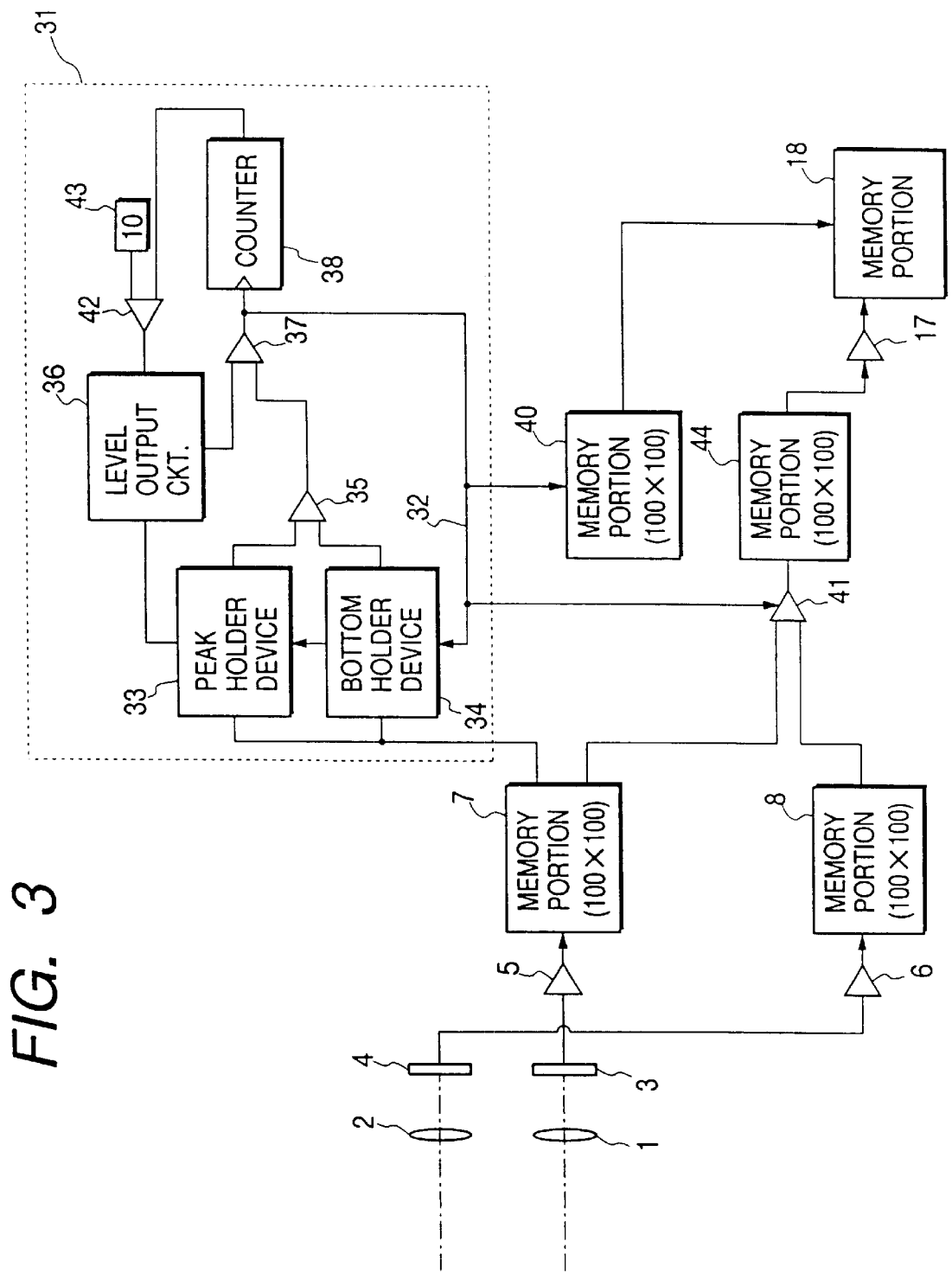
FIG. 3 is a block diagram to show the construction of an object information processing apparatus (of variable length correlation) in the second embodiment of the present invention.

FIG. 3 is a block diagram to show the construction of another object information processing apparatus in the second embodiment of the present invention, in which portions having the same functions as those in FIG. 1 are denoted by the same reference numerals.

A feature of this embodiment is an adjusting portion of a circuit 31 for compressing resemble portions (i.e., a circuit for compressing resemble portions in such a manner that a repetition of "white, white, white, . . . , white" is changed into length information of "ten whites"), and the essence is that about ten groups are taken out from a changing part of a pattern up to a flat portion in units of the changing part and correlation is taken for the groups.

Describing in more detail, a detector 35 first detects a width of a signal from a predetermined position through a peak holder device 33 and a bottom holder device 34 reset through a signal line 32, and the width is compared with a predetermined level from a pattern extraction level output circuit 36 in a comparator 37. When the width exceeds the predetermined level, a counter 38 starts counting a number of pieces to be handled by the circuit for performing compression of resemble portions. The result up to this point is stored in a border memory portion 40 and at the same time as this, the peak holder device 33 and bottom holder device 34 are reset and the correlation operation in a correlater 41 is carried out in units of pixels up to this point.

Namely, the present embodiment is so arranged that the image data of 100×100 in the memory portion 7 is read out in a predetermined order, that when a difference between the maximum and the minimum of the data thus read out reaches the predetermined value, the correlation operation is carried out for image signals in the range up to that point with respect to associated signals in the memory portion 8, and that thereafter, the above operation is repeated for the other ranges of image data. The present embodiment is different from the first embodiment in that the units of the correlation operation are not fixed to the image of 10×10.

Here, it is not preferred to be too sensitive to fine patterns or to overlook a light pattern and regard the entire screen as being a correlation object because of improper setting of the contrast unit (the level set in the circuit 36), depending upon the patterns. Therefore, the number of patterns counted by the counter 38 is compared with constant information "10" from a constant circuit 43 in a comparator 42. If the number of patterns is different by too much from the constant information, the level in the pattern extraction level output circuit 36 is updated, and a moderate number of pattern groups is extracted in a variable length to be about ten groups. Taking a correlation for such groups, correlation to match a pattern can be taken without increasing the correlation operation too much.

A memory portion 44 can store the correlation results as distance information having addresses of "100×100" for about "10×10" blocks, and the memory portion 18 can store the size of the field and the distribution of sizes, taking into account an output (the magnification of the object) from the magnification detector 17, similarly as in FIG. 1.

The above two methods (i.e., the methods in the first embodiment and the second embodiment) can be said to have only the following differences: the first method limits the operation to the fixed length of "10×10," image signals are subjected to preprocessing, and group extraction is carried out again based on original signals in obtaining pattern groups (the first embodiment); whereas, the second method employs the operation in variable lengths of about "10×10" depending upon patterns, group extraction is almost finished at this stage, and only regrouping for only one eye is carried out later on (the second embodiment).

These correspond such that, in calculating a correlation, characteristic points of a pattern are mainly taken into account because of their great contribution and nearly flat patterns are treated lightly (or weighted lightly). Namely, the former corresponds to helping extraction of an image by suppressing fine patterns in the fixed length to simplify the field, and the latter corresponds to extracting groups including fine patterns from the beginning.

Here, the compression adjustment of resemble portions in FIG. 3 achieved extraction of groups with the predetermined level difference to become about ten groups, but grouping may be performed with a predetermined level lowered by "10±5," grouping may be performed with the predetermined level being not only the image luminance difference level, but also a differential level, or grouping may be performed with a quadratic differential (=point of inflection) level.

Since the latter variable length grouping is equivalent to filtering with a spatial filter (window) matching a group length together with the correlation operation, a flat pattern will have a long group length, so that the correlation operation can be performed as focused on low frequencies. Thus, it has a feature that the correlation operation can be performed so as to be suitable for pattern frequencies.

This becomes clearer with a limited number of pixels for correlation operation.

If input pixels to the correlater of "10 by 10" are limited to A' (10), B' (10), the following correspondence is effected for groups A (x), B (x) of variable lengths, where x=about 5 to 15.

If x=5 then $A_{(1)}=A_{(1)}'=A_{(2)}'$.
If x=10 then $A_{(1)}=A_{(1)}'$.
If x=15 then $A_{(1)}+(\frac{1}{2})A_{(2)}=A_{(1)}'$.

It is clear that this correspondence becomes a spatial filter.

Figure 4:
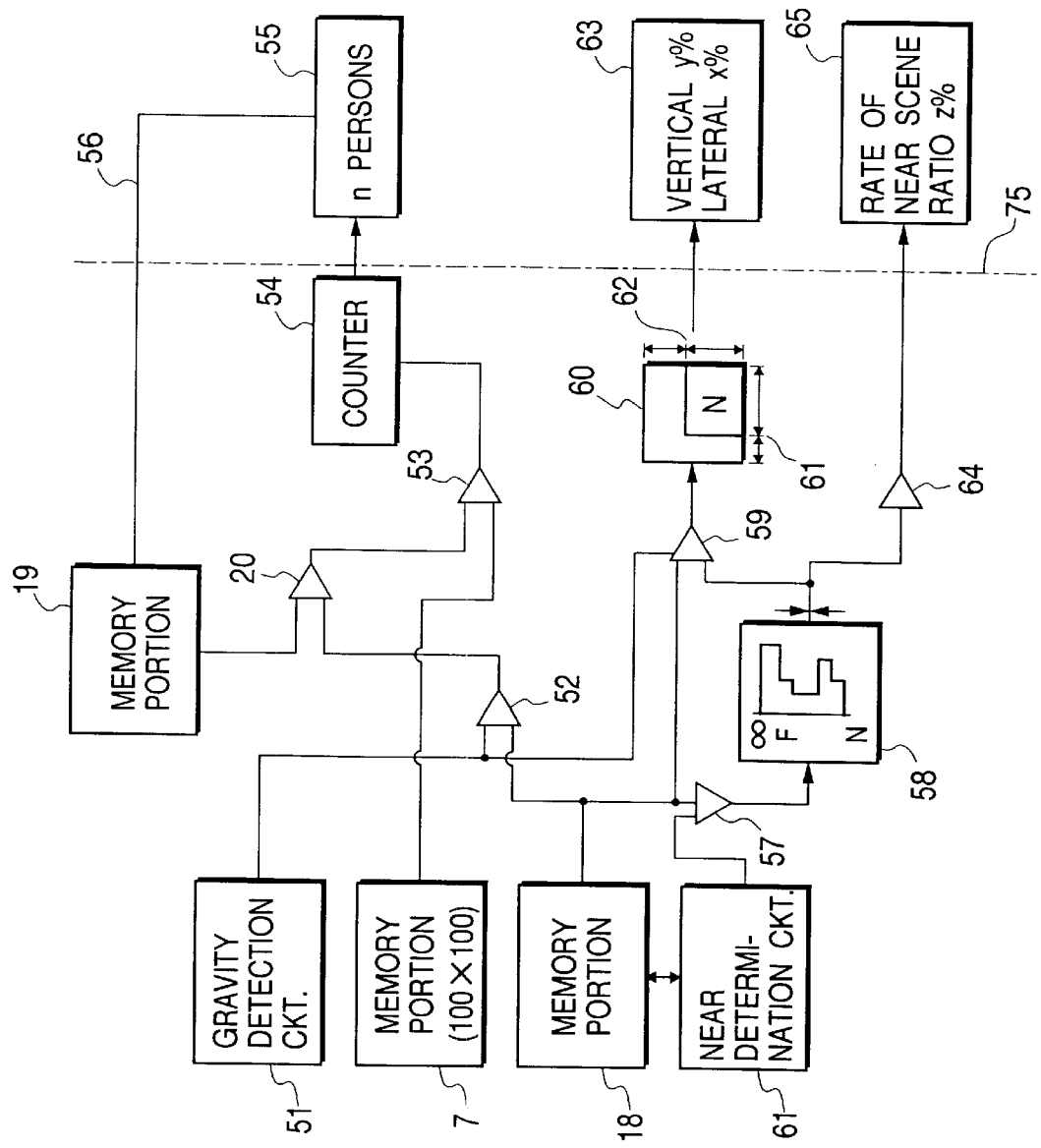
FIG. 4 is a block diagram to show the construction for discrimination of a pattern and extraction of numerical information.

FIG. 4 is a block diagram to show a processing circuit for performing pattern coincidence and extraction, and this processing circuit is added to the circuit of FIG. 1.

As described previously, from the arrangement information (shape) including the size of an object on the field, distance-grouped and stored in the memory portion 18, and from gravity direction information from a well-known gravity detecting circuit 51, a selector 52 selects horizontal (lateral) segments, and a selector 20 performs automatic selection (=masking) with the information regarding the size of a standard field (object) stored in the memory portion 19, for example with information of "the range of from some ten cm to about 1.5 m" for objects of many persons. The result is supplied to a correlater 53. Then, a correlation is obtained for image information in the memory portion 7 with the above information, and a counter 54 counts a number of resemble patterns.

A display 55 indicates this numerical value, whereby it can inform how many patterns with widths looking like a man exist, that is, how many persons are to be photographed.

This simple numerical information can inform the photographer of the information regarding whether all members are in the field upon memorial photography, in an easily understandable form. Particularly, in the case of photography with remote control or the like, the simple numerical information in the form of one to two digits can be transmitted as important information, equivalent to information regarding a photographing range.

A signal line 56 is a control line for changing the units, depending upon the type of pattern automatically selected, between "person(s)" and "piece(s)."

Further, because of the use of the masked original information, a reference pattern can be arranged to correspond to each of other cases, including only children or including only big persons (e.g., overweight or tall persons).

Reference numeral 57 designates a mask as detailed later, and 58 a distribution determination device for counting a distribution (=area) for every distance. From this distribution, a distance at a valley of the distribution is calculated in the range of "middle to far distances," and a comparator 59 reconstructs "far" and "near" distance groups as compared with the distance thus calculated. The information from the comparator 59 is stored together with the gravity direction information from the gravity detecting circuit 51 in a memory portion 60 in the form of information as to the two far and near groups in the screen (i.e., far and near border information 61, 62).

Next, this far and near border information 61, 62 is indicated on a display 63 so as to show layout information (near scene rate information) about what percentage is occupied by the near pattern in the vertical and horizontal directions. The layout information is given as information for framing. Further, a rate calculator 64 calculates far and near areas, and lets a display 65 display a ratio of the areas on the screen.

Namely, a distribution is formed for numbers of blocks with a factor of a distance from the distance information stored in the memory portion 18 (the aforementioned distance information of an object O and distance information of each of the other blocks). Then, the distance at the valley is obtained as described above. Then, the blocks are grouped into a group of far blocks and a group of near blocks with the distance as a border. Then, rates on the X and Y axes are obtained for the group of the near blocks on the screen. The rates thus obtained are displayed on the display 63, and a ratio of the far and near groups, that is, a ratio of the far and near areas is indicated on the display 65.

If a near object is counted in this case, it will cause an error. Thus, masking is effected by near determination circuit 61 and mask circuit 57.

Figure 5:
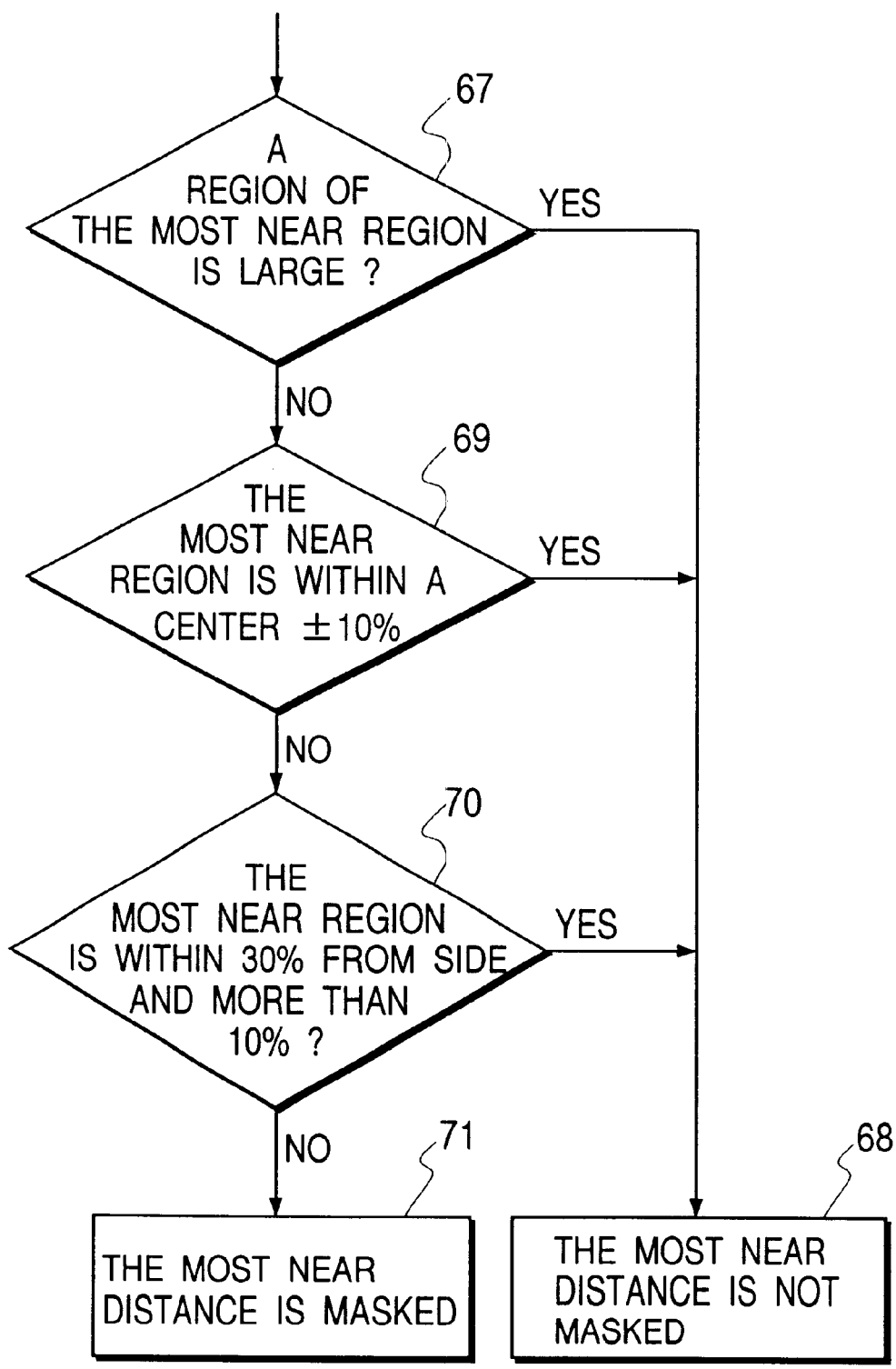
FIG. 5 is a flowchart to show near region determination processing in the second embodiment of the present invention.

In this near determination circuit 61, as shown in FIG. 5, it is determined at step 67 whether the near region (group) is large. If it is large, the flow proceeds to step 68 not to mask (or exclude) this group. Further, if a near region, even though small, is located in the center of screen, a scene, the next determination at step 69 leaves the region so as not to be masked. If a near region, even on the side area, has some size, the next determination at step 70 leaves it as an object so as not to be masked. The other near areas are regarded as forward obstacles, and the near distances are masked at step 71 to be ignored (or to be excluded from objects for determination in the distribution determination circuit 58). In this manner, near-range noise is suppressed in determination of a distribution in the distribution determination device 58.

As indicated by numeral 75 in FIG. 4, the displays 55, 63, 65 may be separated and set on the side of a remote control apparatus, whereby the photographer can manipulate a shutter release from the apparatus or a tripod head to check the layout to be photographed. (Conventionally, such checking of the layout cannot be possible without using an expensive electronic finder and a complicated image transmission.)

Other examples of displays on the side of the remote control apparatus (remote apparatus) will be explained referring to FIGS. 6A1 to 6C2 through FIGS. 8A to 8C.

When the display 55 (which is assumed to be provided on the main apparatus) in FIG. 4 indicates the information regarding the number of persons as shown on the right side (FIGS. 6A2 to 6C2), the display 75 such as an LCD for remote display indicates a pattern 78 preliminarily determined, as shown in FIGS. 6A1 to 6C1, based on a numerical value transmitted through a radio or wire, thus presenting a graphic display or a segment display corresponding to the numerical indication on the display 55. Although this example shows numerical indications of one digit, the numerical indications may be of two digits.

This realizes indications to allow the photographer to diagrammatically judge whether persons desired to be photographed are actually in the field, as reference information for framing.

In addition, if the arrangement information in the memory portion 60 in FIG. 4 is of about "2 digits×4" (far: xx %, near: xx % for each of the two dimensions), the indications can be displayed in a form close to an actual layout, for example, including positions in the lower part or in the central part.

FIG. 7 shows an example to simply show the layout, which permits the arrangement information of about "2 digits×4" in the memory portion 60 in FIG. 4 to be indicated by dot indication on layout reference lines such as the golden section (which means a divisional ratio known as having a good balance in pictures, sculptures, etc.).

This permits the photographer to check the scene layout at a remote place upon self photography or the like.

Figure 8A:
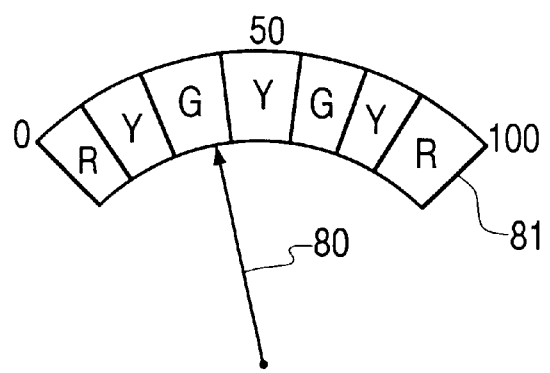
FIGS. 8A to 8C are drawings similarly to illustrate other examples of a remote display with indications on the display 44 in FIG. 4.

FIG. 8A shows an example in which a pointer 80 indicates the near-range area ratio information of one to two digits in the display 65 of FIG. 4 like a meter, and in which an index 81 includes red zones R to indicate unpreferred occupancy rates 0 and 100% in the near range, green zones G to indicate preferred rates, for example 30% or 70%, and yellow zones Y to indicate difficulties in determining whether the rates are preferred or unpreferred, for example 50%. This arrangement permits the photographer to check indication of an occupancy rate.

Figure 8B:
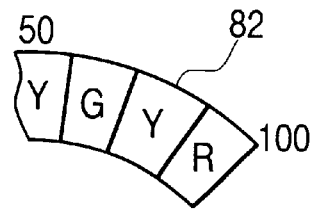
Figure 8C:
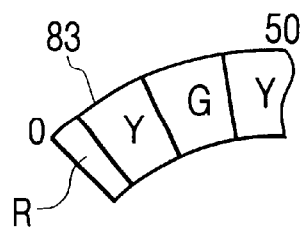
Figure 9:
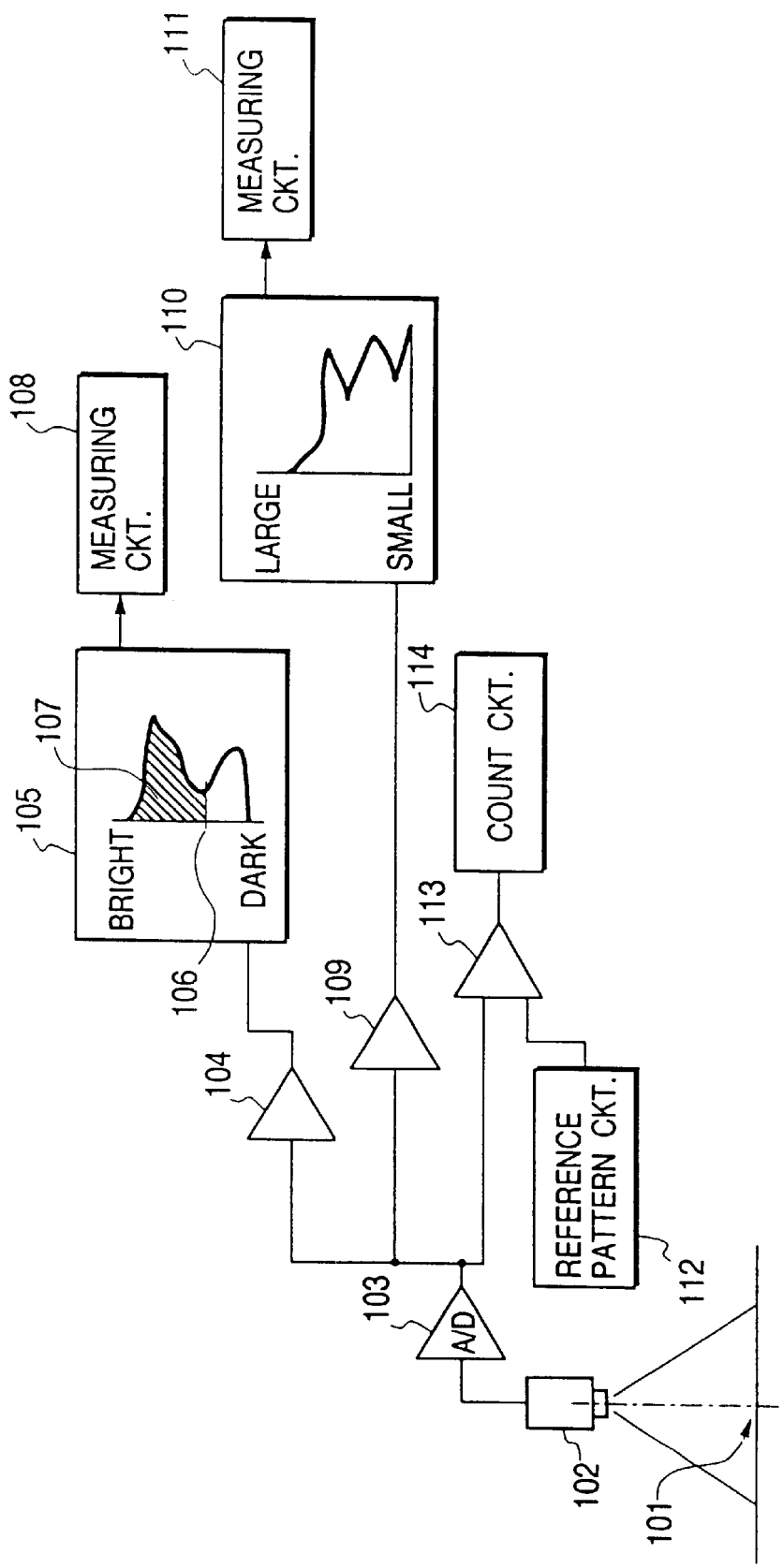
FIG. 9 is a block diagram to show the schematic construction of a conventional example used in the fields of industrial instrumentation, etc.
Figure 10:
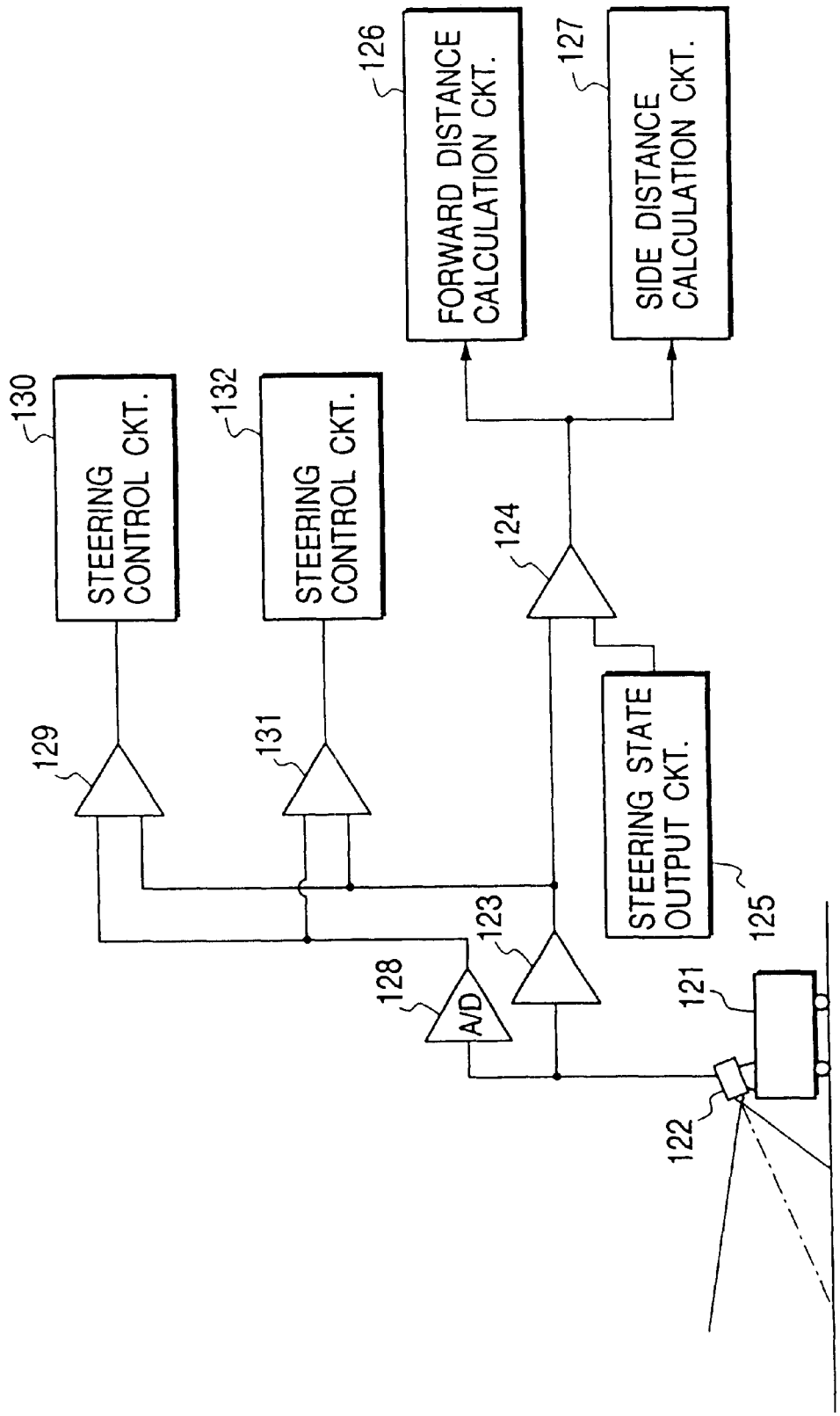
FIG. 10 is a block diagram to show the schematic construction of another conventional example, which was reported in a research report as to automated traveling or the like of a car or robot.

If the contrast of the far group and the contrast of the near group are measured and transmitted, the index may be modified based thereon, for example, to an index shown by numeral 82 in FIG. 8B for cases of greater far-side contrast because there is no problem caused with great occupancy rates of the near group, or to an index in the lower part of the occupancy rates as shown by numeral 83 in FIG. 8C, because a small pattern becomes outstanding if the near-side contrast is relatively great. This permits an indication of an occupancy rate closer to actual evaluation of the photograph.

By diagrammatically indicating the layout information on the separate display in this manner, the information can be transmitted as useful information to the photographer without using a bulky apparatus for transmission and reception of the original picture.

Of course, the indications shown in FIGS. 6A1 to 6C2 to FIGS. 8A to 8C may be arranged to be displayed on the photographing apparatus side.

According to each of the embodiments as described above, the size or shape of an object is extracted using the means for readily measuring the distance information or luminance information for multiple points, parameters of the object are obtained using the data regarding an object set, and they capable of being transmitted to the photographing apparatus itself or the remote apparatus, so as to inform the photographer of the data as effective information for determining photography.

Namely, the distance measurement (the distance measurement operation only for luminance changing points, the distance measurement of the background+luminance changing points, etc.) is carried out in detail only for portions necessary for discrimination in the field having a variety of patterns, which simplifies the distance measurement operation, likely to become complicated in processing, and which permits the information to be transmitted without being puzzled by patterns. Thus, the total operation of the discrimination becomes simplified to obtain necessary information.

Briefly speaking, the embodiments realized extraction of necessary characteristic patterns (objects) from the field by as simple processing as possible, and the use of the patterns for the photographer's framing by expressing the patterns in a form easily understandable by the photographer to perform framing, or in the form of a numerical value.

The above simple measuring means is essential to portable devices, which needs to meet conditions with a lot of restrictions with respect to limited power or processing performance as compared with conventional industrial image processing apparatus.

As compared with the industrial apparatus, the present invention can be applied widely to conditions of use of the device without limitations on the size of an object or the photographic distance, the information is indicated as an object or is also displayed on a remote display, based on a check of field parameters in addition to the information obtained therefrom, and transmission of only effective information for photography achieves an indication effective for framing and easily recognizable by the photographer, thus achieving a system easy to use without necessarily having to handle the entire mass of photographic information.

Although the examples present invention were described with application to cameras such as single-lens reflex cameras, lens shutter cameras, video cameras, etc., the present invention can also be applied to other optical instruments, other apparatus, and applications as a constituent unit.

Further, the present invention may be applied to applications constructed by appropriately combining the above embodiments or the techniques thereof.

What is claimed is:

1. An information processing apparatus using a distance measuring apparatus, said information processing apparatus comprising:

first and second area sensors;

a distance calculation circuit which divides said first area sensor comprising a plurality of pixels into a plurality of pixel blocks, divides said second area sensor comprising a plurality of pixels into a plurality of pixel blocks, and calculates distance for each of pixel blocks in said first and second area sensors; and a shape determination circuit which selects pixels blocks, as a specific area, which are calculated as representing a shorter distance than the distance represented by the other pixel blocks, extracts a contrast changing point in the specific area on the basis of brightness information of each of pixels in the specific area, confines a boundary portion of an image in the specific area from the extracted contrast changing point information, and specifies a shape of the image.

2. An information processing apparatus according to claim 1, wherein said shape determination circuit includes a display circuit which displays information which is based on the shape specified by said shape determination circuit.

3. An information processing apparatus according to claim 1, wherein said shape determination circuit includes a display circuit which displays the shape specified by said shape determination circuit.

4. An information processing apparatus according to claim 1, further comprising a remote display apparatus receiving and displaying information which is transmitted by said shape determination circuit by air and is based on the shape specified by said shape determination circuit.

* * * * *

UNITED STATES PATENT AND TRADEMARK OFFICE
CERTIFICATE OF CORRECTION

PATENT NO.    : 6,370,262 B1
DATED         : April 9, 2002
INVENTOR(S)   : Takashi Kawabata It is certified that error appears in the above-identified patent and that said Letters Patent is hereby corrected as shown below:

Column 11,
Line 53, "capable" should read -- are capable --.

Column 12,
Line 8, "needs" should read -- need --.
Line 23, "the examples" should read -- the examples of the --.
Line 44, "pixels blocks" should read -- pixel blocks --.

Signed and Sealed this

Sixth Day of August, 2002

Attest:

JAMES E. ROGAN
Attesting Officer    Director of the United States Patent and Trademark Office